(12) United States Patent
Polo et al.

(10) Patent No.: US 9,408,147 B2
(45) Date of Patent: Aug. 2, 2016

(54) ENHANCED RATE PHYSICAL LAYER FOR BLUETOOTH™ LOW ENERGY

(71) Applicant: Broadcom Corporation, Irvine, CA (US)

(72) Inventors: Angel Polo, Solana Beach, CA (US); Farooq Muhammad Hameed, Parkland, FL (US); Hea Joung Kim, Irvine, CA (US); Ming Lin, Tustin, CA (US); Siukai Mak, San Diego, CA (US); Guoxin Xie, San Diego, CA (US); Thomas Baker, Monarch Beach, CA (US); Prasanna Desai, Elfin Forest, CA (US); Robert Hulvey, Redondo Beach, CA (US); Henrik Tholstrup Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 189 days.

(21) Appl. No.: 14/023,416

(22) Filed: Sep. 10, 2013

(65) Prior Publication Data
US 2014/0086125 A1    Mar. 27, 2014

Related U.S. Application Data

(60) Provisional application No. 61/705,075, filed on Sep. 24, 2012.

(51) Int. Cl.
| | | |
|---|---|---|
| H04W 52/02 | (2009.01) | |
| H04W 8/00 | (2009.01) | |
| H04W 4/00 | (2009.01) | |
| H04B 10/516 | (2013.01) | |
| H04L 27/00 | (2006.01) | |

(52) U.S. Cl.
CPC .......... *H04W 52/0229* (2013.01); *H04W 8/005* (2013.01); *H04W 52/0216* (2013.01); *H04B 10/516* (2013.01); *H04L 27/0012* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 7,054,296 | B1 * | 5/2006 | Sorrells et al. | 370/338 |
| 2005/0089113 | A1 * | 4/2005 | Seidl | 375/271 |
| 2006/0084382 | A1 * | 4/2006 | Ibrahim | H04L 27/0012 455/41.2 |
| 2010/0272159 | A1 * | 10/2010 | Lim | H04J 11/003 375/146 |
| 2011/0021142 | A1 * | 1/2011 | Desai et al. | 455/41.2 |
| 2011/0074552 | A1 * | 3/2011 | Norair | G06K 7/0008 340/10.1 |

* cited by examiner

*Primary Examiner* — Edan Orgad
*Assistant Examiner* — Saumit Shah
(74) *Attorney, Agent, or Firm* — McDermott Will & Emey LLP

(57) ABSTRACT

A method of communicating data in a Bluetooth™ low energy (BLE) module is provided. The method includes modulating an outbound communication signal into a modulated signal with a particular modulation scheme based on a modulation type, and transmitting the modulated signal to a remote device via a wireless communication connection associated with the modulation type. The method also includes receiving an inbound radio frequency (RF) signal, determining if the inbound RF signal is associated with a modulation type, and demodulating the inbound RF signal with a particular modulation scheme based on the modulation type if the inbound RF signal is determined to be associated with a modulation type. In some aspects, the inbound RF signal and outbound modulated signal have symbol rates of 2 Megasymbols per second. In some implementations, the method includes switching between a legacy BLE system and an enhanced rate BLE system.

20 Claims, 9 Drawing Sheets

ENHANCED RATE PHYSICAL LAYER FOR BLUETOOTH™ LOW ENERGY

CROSS-REFERENCE TO RELATED APPLICATIONS

The present application claims the benefit of U.S. Provisional Patent Application Ser. No. 61/705,075, titled "ENHANCED RATE PHYSICAL LAYER FOR BLUETOOTH™ LOW ENERGY," filed on Sep. 24, 2012, which is hereby incorporated by reference in its entirety for all purposes.

FIELD

The subject technology generally relates to Bluetooth™ wireless technology and, in particular, to Bluetooth™ Low Energy systems.

BACKGROUND

Bluetooth™ low energy (BLE) is a specification that enables radio frequency communication between various types of devices. One particular portion of the BLE standard is the advertiser/scanner model that allows a device designated as an advertiser device to broadcast information that can be received by one or more scanner devices. Bluetooth™ modules implementing a BLE standard are often integrated into various types of mobile devices that are battery powered. Accordingly, managing power consumption associated with the Bluetooth™ modules is a concern as it pertains to battery life concerns in mobile devices, including smartphones, laptop computers, tablet computing systems, and other electronic devices.

SUMMARY

A system and/or method is provided for enhanced rate physical layer for Bluetooth™ Low Energy, substantially as illustrated by and/or described in connection with at least one of the figures, as set forth more completely in the claims.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject disclosure provides an enhanced rate physical layer for Bluetooth™ Low Energy 2 (BLE2) systems. BLE2 systems include enhancements to the BLE physical layer to support a data transfer rate of 2 Mbps. The BLE2 systems provide for the receipt and decoding of packets that have been encoded with an enhanced modulation scheme using 2 Mbit modulation, as well as packets encoded with a legacy modulation scheme using 1 Mbit modulation, in the same receive window. In this regard, BLE2 systems provide for increased data rates, increased scheduling capacity and decreased power consumption characteristics as compared with legacy Bluetooth™ Low Energy systems.

In some implementations, a method of communicating data in a Bluetooth™ low energy (BLE) module is provided. The method includes receiving an outbound communication signal, coding the outbound communication signal into a modulated signal with a particular modulation scheme based on a modulation type, and transmitting the modulated signal to a remote device via a wireless communication connection associated with the modulation type. In some aspects, the modulated signal has a symbol rate of 2 Megasymbols per second.

In one or more implementations, the method includes receiving an inbound radio frequency (RF) signal, determining if the inbound RF signal is associated with a modulation type, and demodulating the inbound RF signal with a particular modulation scheme based on the modulation type if the inbound RF signal is determined to be associated with a modulation type. In some aspects, the inbound RF signal has a symbol rate of 2 Megasymbols per second.

Figure 1:
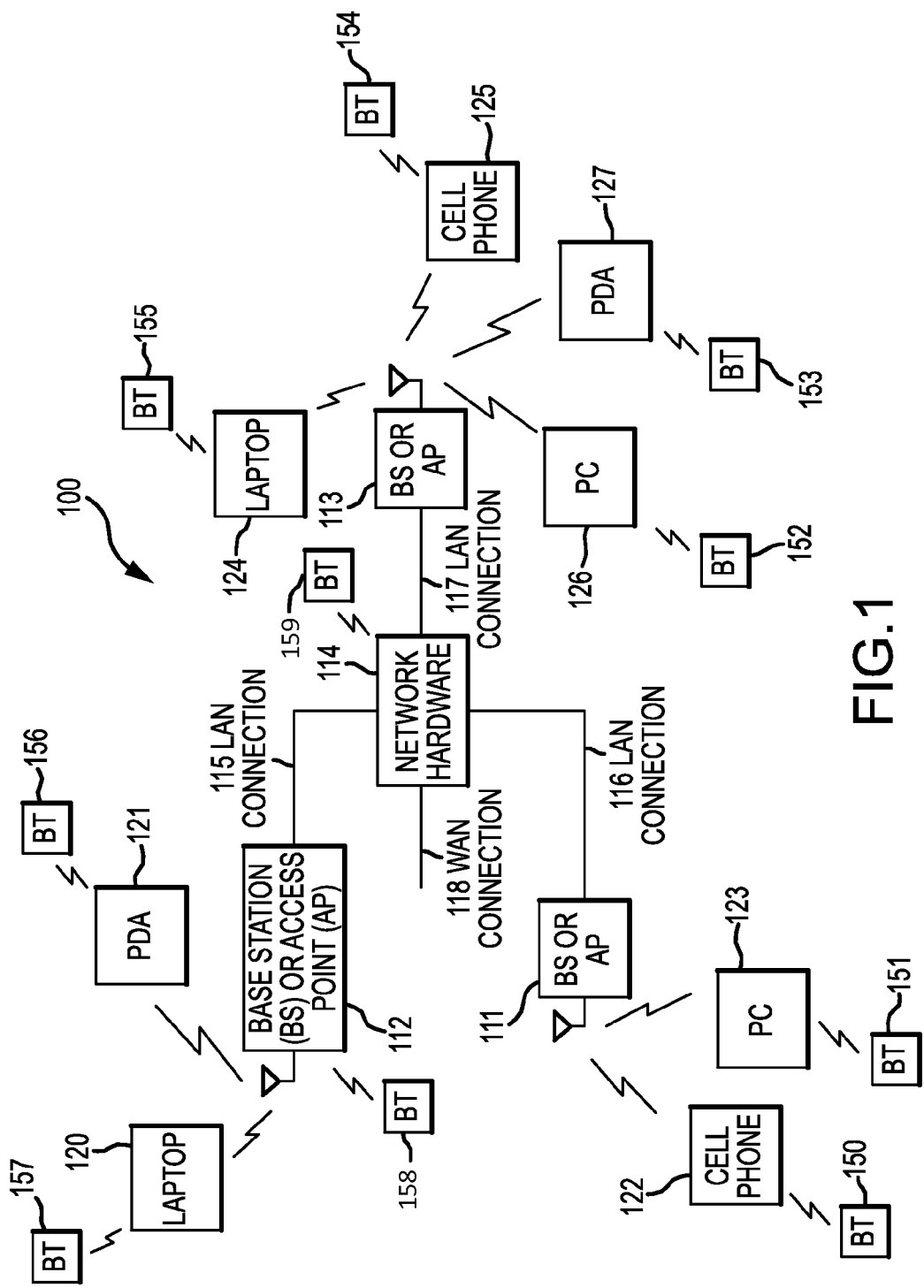
FIG. 1 illustrates an example of a wireless communication system according to one or more implementations of the subject technology.

FIG. 1 illustrates an example of a wireless communication system 100 according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The wireless communication system 100 includes base stations (BS) and/or access points (AP) 111-113 (an AP may be a personal control point), wireless communication devices 120-127 and a network hardware component 114. The wireless communication devices 120-127 include laptop computers 120 and 124, personal digital assistants 121 and 127, personal computers 123 and 126, cellular telephones 122 and 125, and/or any other type of device that supports wireless communications.

The base stations or access points 111-113 are operably coupled to network hardware 114 via respective local area network (LAN) connections 115-117. Network hardware 114, which may be a router, switch, bridge, modem, system controller, may provide a wide area network (WAN) connection 118 for the wireless communication system 100. Base stations or access points 111-113 have an associated antenna or antenna array to individually communicate with wireless communication devices in its area. The wireless communication devices register with a particular base station or access point 111-113 to receive services within the wireless communication system 100. For direct connections (e.g., point-to-point communications), the wireless communication devices may communicate directly via an allocated channel.

Base stations can be used for cellular telephone systems (including 3G and 4G systems) and like-type systems, while access points may be used for in-home or in-building wireless networks. Regardless of the particular type of communication system, each wireless communication device may include a built-in radio and/or is coupled to a radio. The radio includes a linear amplifier and/or programmable multi-stage amplifier to enhance performance, reduce costs, reduce size, and/or enhance broadband applications. The radio also may include, or is coupled to, an antenna or an array of antennas having a particular antenna coverage pattern for propagation of outbound radio frequency (RF) signals and/or reception of inbound RF signals. In some aspects, the array of antennas may be directional antennas (e.g., beam-forming).

One or more of the shown devices may include circuitry and/or software that allows the particular device to communicate using Bluetooth™ (BT) communication system technology with each other or with proximal BT devices 150-159. The range of communication using BT is shorter than typical wide local area network (WLAN) links. A BT communication link may utilize various versions of a BT specification, including the Bluetooth™ Core Specification Version 4.0, Volume 6 (Low Energy Controller Volume) that pertains to Bluetooth™ Low Energy (BLE). Although BLE may operate in conjunction with classical BT, BLE does have a functional difference in the application of the protocol for establishing a communication link between two or more BLE compatible devices.

Figure 2:
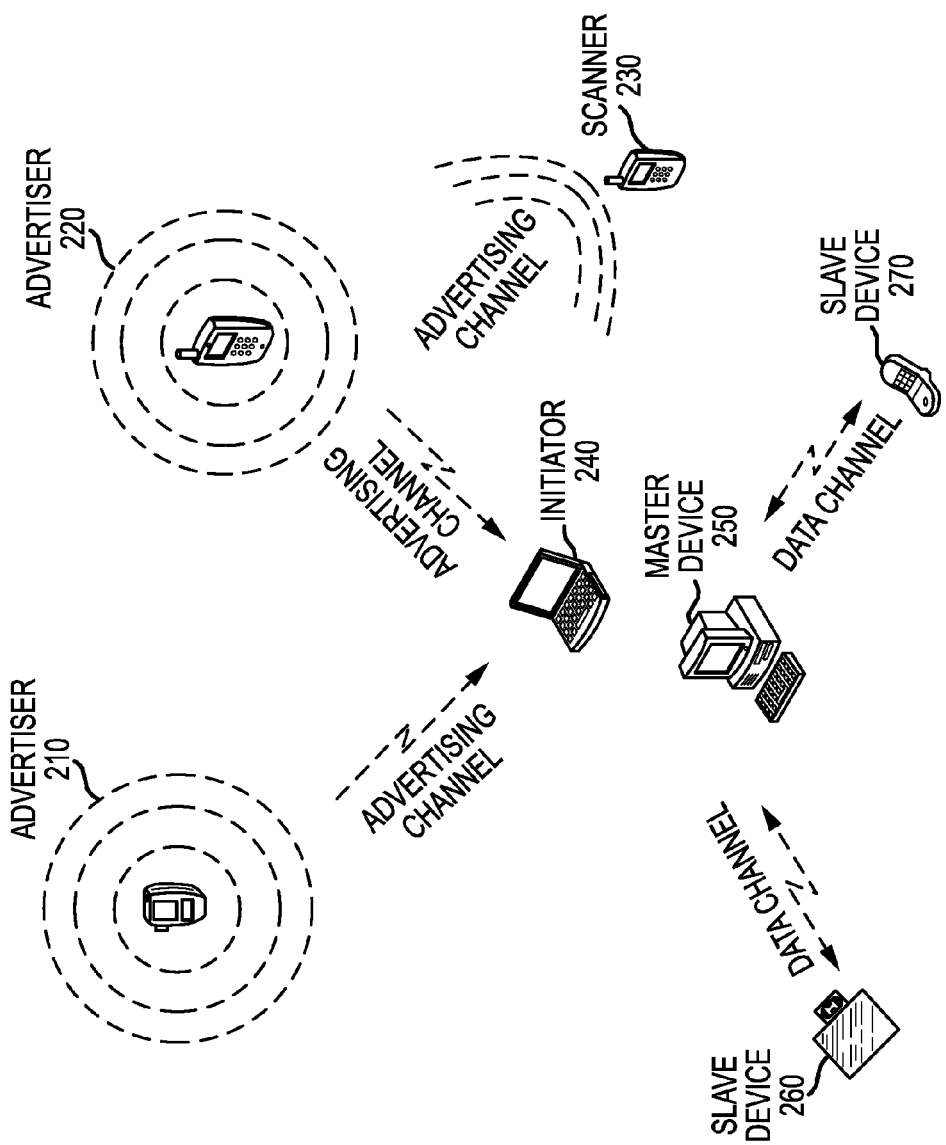
FIG. 2 illustrates an example of a Bluetooth™ Low Energy (BLE) communication system that is operable to support enhanced rate Bluetooth™ Low Energy (BLE2) activities according to one or more implementations of the subject technology.

FIG. 2 illustrates an example of a Bluetooth™ Low Energy (BLE) communication system 200 that is operable to support enhanced rate physical layer Bluetooth™ Low Energy (BLE2) activities according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The BLE communication system 200 includes BLE2 devices, of which advertisers 210 and 220, a scanner 230, an initiator 240, a master device 250, and slave devices 260 and 270 are provided.

The BLE communication system 200 may operate in the unlicensed 2.4 GHz industrial, science and medical (ISM) radio band. The BLE communication system 200 may employ a frequency hopping transceiver that uses a shaped, binary frequency modulation. In some aspects, the symbol rate is 1 Megasymbols per second (Ms/s) that supports a data rate of 1 Megabits per second (Mb/s). In one or more implementations, the symbol rate is 2 Ms/s that supports a data rate of 1 Mb/s and/or 2 Mb/s depending on implementation. In this regard, BLE2 activities operate with a symbol rate of 2 Ms/s that supports a data rate of 2 Mb/s.

The BLE communication system 200 may be operable to utilize a frequency division multiple access (FDMA) scheme and a time division multiple access (TDMA) scheme to support vice and/or data communication. The BLE communication system 200 may be configured to operate on up to 40 physical channels, separated by 2 MHz or greater, into advertising channels and data channels per the FDMA scheme. In this regard, three (3) channels may be implemented as advertising channels and up to thirty-seven (37) channels may be implemented as data channels. In some aspects, the physical channels are separated by 4 MHz. In advertising channels, a BLE2 device may function in a role as an advertiser, a scanner, or an initiator. In data channels, a BLE2 device may play a role as a master or a slave. The BLE communication system 200 may be enabled to utilize a TDMA based polling scheme in link layer communications between the master device 250 and the slave devices 260 and 270. In this regard, the TDMA based polling scheme involves one device (e.g., master device 250) transmitting a packet at a predetermined time and a corresponding device (e.g., slave device 260) responds with a packet after a predetermined time.

An advertiser, such as the advertiser 220, may be enabled to broadcast advertisements periodically in the advertising channels. In this regard, devices that transmit advertising packets on the advertising channels are referred to as advertisers. The advertiser 220 may be configured to advertise service and/or availability for a link layer connection. The advertiser 220 may be enabled to transmit advertising packets within advertising events. An advertising event may begin with the presence of an advertising packet sent by the advertiser 220.

The advertiser 220 may be operable to determine whether or not a received request should be processed based on a white list. The white list includes a list of, for example, 48 bit Bluetooth™ low energy device addresses of preferred BLE2 devices. When using the white list for device filtering, the advertiser 220 may be configured to process requests from those BLE2 devices in the white list. In this regard, the advertiser 220 may be enabled to facilitate smart device filtering using a white list including device class bits of preferred BLE2 devices. The advertiser 220 may be configured to use the white list for device filtering based on device class bits other than 48-bit Bluetooth™ low energy device addresses. The advertiser 220 may become a slave device once an associated link layer connection has been set up.

The scanner 230 may be operable to search for advertising BLE2 devices within range. In this regard, devices that receive advertising on the advertising channels without the intention to connect to the advertising device (e.g., advertiser 220) are referred to as scanners. The scanner 230 may be configured to perform a passive scan or an active scan. In a passive scan, the scanner 230 may be enabled to listen for advertising packets and may not transmit messages to advertisers. In an active scan, the scanner 230 may request an advertiser to transmit additional information that may not be available in the received advertising packets. The scanner 230 may be operable to select a scan interval and a scan window for a scanning process. If the scan interval and the scan window are set to be the same value, the scanning process may be run in advertising channels continuously. The scanner 230 may be operable to scan different advertising channels between two consecutive scan windows. The scanner 230 may be enabled to stay on one advertising channel for one scan window or multiple scan windows.

The scanner 230 may be operable to discover information about available advertisers in a local area. The scanner 230 may be configured to use a white list for device filtering. The scanner 230 may be enabled to process advertising packets from advertisers in the white list. The white list may include a list formed by device class bits of preferred BLE2 devices. The scanner 230 may be enabled to use the white list for device filtering based on device class bits other than 48-bit Bluetooth™ low energy device addresses.

The scanner 230 may be operable to set control scan windows in order to reduce power consumption. For example, the scanner 230 may be operable to turn on a scan window at time for expected advertising packet transmissions. In this regard, the scanner 230 may be enabled to evaluate cadence of the advertising packet transmissions to determine timing of expected advertising packet transmissions. The scanner 230 may be operable to reduce the scan window size for the expected advertising packet transmissions. The scanner 230 may be enabled to close the scan window for unexpected advertising packet transmissions to save power. Alternatively, the scanner 230 may be enabled to perform conditional scanning for expected advertising packet transmission. The scanner 230 may be configured to scan selectively on the advertising channels used by intended advertisers such as the advertiser 220. The scanner 230 may be enabled to estimate advertising intervals utilized by the advertiser 220. The scanner 230 may be enabled to narrow or reduce the scan window size for the scanning process. The use of reduced scan window size may lead to lower power consumption on the scanner 230.

For coexistence with Bluetooth™ communication, the scanner 230 may be configured to scan advertising packets between idle intervals within other Bluetooth™ traffic communications. The scanning timing may be decoupled from the Bluetooth™ timing. Accordingly, within each of the Bluetooth™ traffic idle intervals, the scanner 230 may be enabled to perform instant scanning. The scanner 230 may have a dual-correlation capability such that BLE2 advertising packets and other packets such as the legacy BLE packets may be detected in an advertising channel. In this regard, the scanner 230 may be operable to tune to a single advertising channel to scan packets transmitted over the single advertising channel. The BLE2 advertising packets and/or the legacy BLE packets may be detected by correlating the scanned packets with, for example, a known sequence rate. In some aspects, the BLE2 advertising packets and/or the legacy BLE packets may be detected based on the modulation type contained therein. For example, the BLE2 advertising packets may include an overhead portion that contains an indication of the modulation type. The dual-correlation capability of the scanner 230 may speed up the link reconnection time by scanning, for example, three advertising frequencies instead of 32 frequencies.

The initiator 240 may be operable to request establishment of a link layer connection with an intended advertiser for advertising packets. In this regard, devices that need to form a connection to another device listen for connectable advertising packets are referred to as initiators. Upon receipt of advertising packets from advertisers (e.g., advertiser 220), the initiator 240 may be enabled to determine specific advertisers to which a connection request (CONNECT_REQ) packet may be transmitted. The initiator 240 may be configured to process advertising packets from advertisers in the white list. In this regard, the white list may include a list recorded with device class bits for preferred BLE2 devices and/or legacy BLE devices. The initiator 240 may be configured to use the white list for device filtering based on the device class bits other than 48-bit Bluetooth™ low energy device addresses.

Upon receipt of advertising packets from an intended advertiser such as the advertiser 220, the initiator 240 may be operable to send a CONNECT_REQ packet in the advertising channel, in which the intended advertiser such as the advertiser 220 is advertising. The CONNECT_REQ packet may include connection parameters such as hopping frequency length used for calculating a data channel for setting up a link layer connection with the advertiser 220. Once a connection is established by the initiator 240, the initiator 240 becomes a master device in what may be referred to as a piconet and the advertising device (e.g., advertiser 220) becomes the slave device. If the intent by the initiator 240 is not to get into a connection, the initiator 240 may be a BLE scanner.

In some aspects, the master device 250 is enabled to communicate with slave devices such as the slave devices 260 and 270. The master device 250 may be capable of supporting multiple link layer connections at a time to various slave devices, such as the slave devices 260 and 270. The master device 250 may be operable to manage various aspects of data packet communication in a link layer connection with an associated slave device such as the slave device 270. For example, the master device 250 may be enabled to determine operation schedule in the link layer connection with the slave device 270. The master device 250 may be enabled to initiate a packet exchange sequence in the link layer connection with its own transmission. Link layer connections may include periodic connection events in data channels. Data packet transmissions may take place within connection events.

In connection events, channel hopping may occur at the start of each connection event. Within a connection event, the master and slave devices alternate sending data packets using the same data channel. The master device initiates the beginning of each connection event and can end each connection event at any time.

During a connection event, data packets may be transmitted with 150 µs spacing (sometimes referred to as inter-frame spacing) and at least one data packet is from the master device 250 in the connection event. The master device 250 may be configured to transmit the first data packet in each connection event to an intended slave such as the slave device 270. In this regard, the slave device 270 may transmit a response after 150 µs has elapsed, which can then be followed by 150 µs of spacing followed by another master transmit. The master device 250 may be operable to utilize a TDMA based polling scheme to poll the intended slave for packet transmission in each connection event. The master device 250 may be enabled to determine packet payload size for data packets and packet transmission timing in each connection event. In this regard, in a coexistence scenario with Bluetooth™ connections, the master device 250 may be enabled to support Bluetooth™ traffic communications as well as concurrent BLE2 activity simultaneously. In this regard, the master device 250 may be enabled to dynamically set or adjust packet payload size for associated BLE2 link layer connections based on the available idle intervals in between Bluetooth™ traffic communications to achieve a higher throughput.

A slave device, such as the slave device 270, may be enabled to communicate with a master such as the master device 250 in an associated BLE2 link layer connection. The slave device 270 may be associated with one or more link layer connections with the master device 250. The slave device 270 may be enabled to synchronize with connection event start points, called anchor points from a slave device's perspective, for data communication with the master device 250. The slave device 270 may consider that a link layer connection setup with the master device 250 may be complete after receiving a connection request (CONNECT_REQ) packet from the master device 250. The slave device 270 may be enabled to calculate a data channel index using a channel selection algorithm for each connection event in the associated link layer connection. The data channel index may be determined based on, for example, a hopping frequency length (Hop_length) in the received CONNECT_REQ packet. The slave device 270 may be enabled to move to a data channel with the calculated data channel index to communicate data packets with the master device 250. The slave device 270 may be operable to transmit data packets in the data channel after receiving a packet from the master device 250 in associated link layer connection.

After the associated link layer connection has been established, the slave device 270 may be operable to receive a connection update request packet from the master device 250 for updating the associated link layer connection parameters such as connection event anchor points. The slave device 270 may be enabled to, for example, synchronize to updated anchor points to continue data communication with the master device 250 in the associated link layer connection. In this regard, in a coexistence scenario with Bluetooth™ connections, the slave device 270 may be enabled to support Bluetooth™ traffic communications as well as concurrent BLE2 activities. The slave device 270 may be enabled to transmit a connection update request packet to the master device 250 for updating the associated link layer connection parameters such as anchor points. The slave device 270 may be enabled to request BLE2 timing in a manner which avoids collisions with concurrent Bluetooth™ traffic communications.

In some aspects, the advertiser 220 is enabled to transmit advertising packets in advertising channels to BLE2 devices such as, for example, the scanner 230 and/or the initiator 240. The scanner 230 may be enabled to scan advertising packets from the advertiser 220 to discover devices within range. The scanner 230 may be enabled to use the white list for device filtering. The scanner 230 may be enabled to process advertising packets from advertisers in the white list. The white list may be formed by device class bits. When coexisting with Bluetooth™ traffic communications, the scanner 230 may be enabled to identify idle intervals within the Bluetooth™ traffic communications such that the scanner 230 may be enabled to perform scan activities within the identified Bluetooth™ traffic idle intervals. The scanner 230 may be enabled to adjust scanning parameters such as the scan window size and scanning timing based on the identified Bluetooth™ traffic idle intervals. In addition, the scanner 230 may be enabled to turn on or off the scan window for low power consumption.

When advertising for a link layer connection, the advertiser 220 may be enabled to listen to CONNECT_REQ packets from the initiator 240. When the white list is used for device filtering, the initiator 240 may be configured to send CONNECT_REQ packets to advertisers in the white list. As stated above, the white list may be formed by device class bits. Upon receiving a CONNECT_REQ packet addressed to the advertiser 220 from the initiator 240, the advertiser 220 may be enabled to move to a data channel and operate as a slave device. When coexisting with Bluetooth™ traffic communications, a slave device such as the slave device 270 may be enabled to support both Bluetooth™ traffic and BLE2 activities simultaneously. The slave device 270 may be operable to support BLE2 activities and concurrent Bluetooth™ traffic communications by requesting update to connection parameters such as connection anchor points in associated link layer connection. The slave device 270 may be enabled to determine expected or desired connection parameters and transmit a connection request packet to the master device 250 for a connection update. Upon being acknowledged by the master device 250, the slave device 270 may be enabled to continue BLE2 packet transmission using the updated connection parameters.

Figure 3:
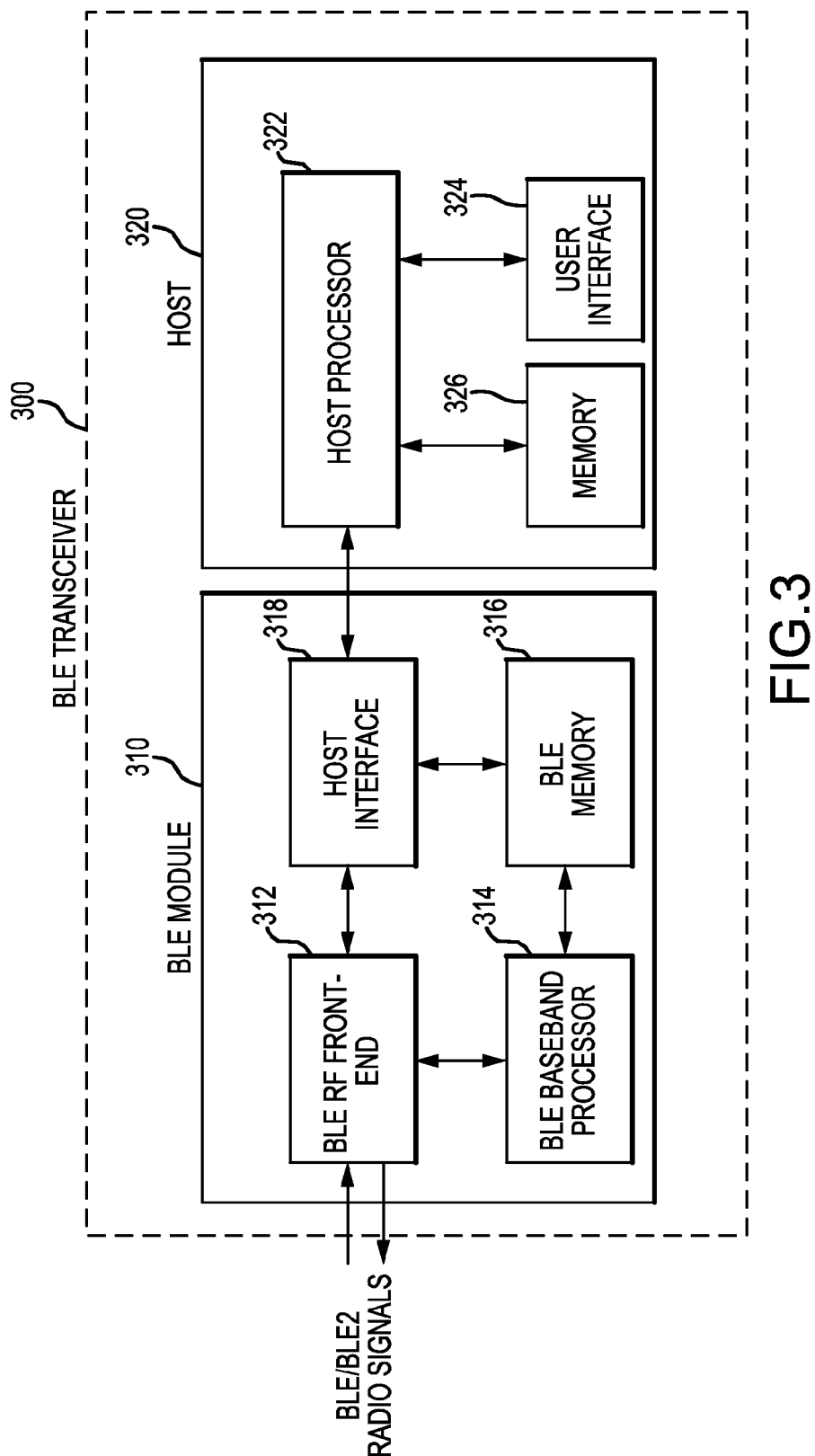
FIG. 3 illustrates an example of a BLE transceiver operable to perform BLE2 activities according to one or more implementations of the subject technology.

FIG. 3 illustrates an example of a BLE transceiver 300 operable to perform BLE2 activities according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The BLE transceiver 300 includes a BLE module 310 and a host 320. The BLE module 310 includes a BLE RF front-end 312, a BLE baseband processor 314, BLE memory 316 and a host interface (I/F) 318. The host 320 includes a host processor 322, a user interface 324, and memory 326. The user interface 308 may include a display, a speaker, a microphone, and/or a keyboard. The keyboard may be a hardware keyboard or a software keyboard (e.g., keyboard presented on the display).

The BLE module 310 may be operable to receive BLE signals and/or BLE2 signals. The BLE module 310 may be enabled to decode and demodulate the received BLE/BLE2 signals. In some aspects, the BLE module 310 is enabled to modulate and encode outbound BLE/BLE2 signals.

The BLE RF front-end 312 may be configured to receive BLE/BLE2 signals and converting the received BLE/BLE2 signals into BLE/BLE2 baseband signals. In some aspects, the BLE RF front-end 312 may be configured to up-convert BLE/BLE2 baseband signals into outbound RF signals and transmit the outbound RF signals via BLE or BLE2 connections.

The BLE baseband processor 314 may be operable to process BLE baseband signals from the BLE RF front-end 312 to extract the information and data bits conveyed in the received signal. The BLE baseband processor 314 may be operable to perform functions such as frequency synchronization, symbol timing estimation, demodulation, and/or decoding. When advertising channel packets such as advertising packets are received, the BLE baseband processor 314 may be enabled to facilitate smart device filtering using a white list stored in the BLE memory 316. The white list may include device class bits of preferred BLE devices. The BLE baseband processor 314 may be enabled to extract device class bits from the received advertising packets and compare with the white list. The BLE baseband processor 314 may be enabled to process the received advertising packets if the extracted device bits may be found in the white list. The BLE baseband processor 314 may be operable to discard the received advertising packets if no entry in the white list is found to match the extracted device class bits. In addition, the BLE baseband processor 314 may be configured to wake up the host processor 322 whenever receiving advertising packets from advertisers is in the white list. The BLE baseband processor 314 may be configured so that it does not to wake up the host processor 322 upon the reception of advertising packets from advertisers not in the white list.

The BLE memory 316 may be operable to store information such as executable instructions and data that may be utilized by the BLE baseband processor 314. The executable instructions may include executable instructions for powering on or off the host processor 322 based on device filtering for processing advertising packets. The BLE memory 316 may be enabled to store the white list for device filtering. For example, without limitation, the BLE memory 316 can include any volatile semiconductor memory, such as RAM, DRAM, SRAM, T-RAM, Z-RAM, and TTRAM. The BLE memory 316 also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

The host processor 322 may be enabled to process BLE baseband signals from the BLE baseband processor 314. The host processor 322, via host I/F 318, may be enabled to receive instructions from the BLE baseband processor 314 to start or stop processing advertising packets in received BLE baseband signals.

The user interface 324 may be enabled to service the BLE transceiver 300 by entering user inputs and/or presenting various services to users. Services implemented via the BLE module 310 may be presented to users as image data on the display and/or as voice via the speaker, for example, by pressing or touching the keyboard and/or generating an audio indication through the microphone.

The memory 326 may be operable to store information such as executable instructions and data that may be utilized by the host processor 322. The executable instructions may include algorithms that may be applied to process legacy BLE packets for various applications. For example, without limitation, the memory 326 can include any volatile semiconductor memory, such as RAM, DRAM, SRAM, T-RAM, Z-RAM, and TTRAM. The memory 326 also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Although a single BLE transceiver 300 is illustrated in FIG. 3, the subject disclosure may not be so limited. Accordingly, the BLE transceiver 300 may be utilized for receiving BLE signals in radio frequency (RF) bands by a BLE initiator and/or a BLE scanner. In addition, the BLE transceiver 300 may be utilized for receiving BLE2 signals in the aforementioned RF bands by a BLE2 initiator and/or a BLE2 scanner.

In some aspects, the BLE transceiver 300 is configured to switch between BLE and BLE2 connections. In one or more implementations, two BLE2 devices may locate each other in a BLE connection. The initiator and/or the scanner devices may be single mode devices (e.g., supports either BLE or BLE2 activities but not both) and/or multi-mode devices (e.g., support both BLE and BLE2 activities). In some aspects, link layer control extensions may be employed to detect and switch from BLE to BLE2 and vice-versa. Switching between BLE and BLE2 connections may be supported using generic attribute profile (GATT) or information in a BLE advertising packet (e.g., advertising channel packet transmitted on a BLE/BLE2 connection or a BLE/BLE2 link layer control packet or other signaling over BLE/BLE2).

In one or more implementations, the BLE transceiver 300 is configured to switch from a first Bluetooth wireless communication mode (e.g., legacy BLE) to a second Bluetooth wireless communication mode (e.g., BLE2) based on the modulation type. The second Bluetooth wireless communication mode may be associated with a data rate (e.g., 2 Mbps) that is greater than the data rate (e.g., 1 Mbps) associated with the first Bluetooth wireless communication mode. In this regard, the second Bluetooth wireless communication mode may be associated with a symbol rate (e.g., 2 Megasymbols per second) that is greater than the symbol rate (e.g., 1 Megasymbols per second) associated with the first Bluetooth wireless communication mode.

To support link layer control of BLE2 activities, link layer control protocol data units (PDU) may have a vendor specific format. In this regard, messages may be kept in the vendor specific format to provide for interoperation with legacy BLE systems. The messages are utilized to detect and switch from BLE to BLE2 and vice-versa. In some aspects, the vendor specific format includes enhanced rate physical layer packet control signaling. In this regard, BLE and BLE2 packets may include an overhead portion that contains the link layer control PDU.

In some aspects, the vendor specific format includes signaling that allows the sender (e.g., advertiser 210 of FIG. 2) to specify whether the sender requests to receive enhanced rate physical layer packets (e.g., packets transmitted at a data rate of 2 megabits per second with a symbol rate of 2 megasymbols per second). The sender also may indicate in the signaling whether a message integrity check (MIC) field is included in the enhanced rate physical layer packets. The vendor specific format of the link layer control PDU may include a modulation type field in a payload portion of the control PDU. In this regard, the overhead portion of legacy BLE packets and BLE2 packets may include an overhead portion that contains an indication of the modulation type. The modulation type may be one (1) octet (or eight (8) bits) in length. The binary indication indicates whether the sender is transmitting legacy BLE packets (e.g., using 1 Mbps Gaussian Frequency-Shift Keying (GFSK) modulation) only, which can be denoted as 0x00. On the other hand, the binary indication may indicate if the sender is transmitting BLE2 packets using 2 Mbps GFSK, which can be denoted as 0x01. In operation, a receiver (e.g., scanner 230 of FIG. 2) may detect the modulation type field in the link layer control PDU to determine the type of Bluetooth™ Low Energy connection (e.g., BLE or BLE2).

In operation, the BLE transceiver 300 may be operable to receive BLE2 signals via the BLE RF front-end 312. The BLE RF front-end 312 may be operable to process received BLE2 signals and convert them into BLE2 baseband signals. The received BLE2 signals may include advertising channel packets such as advertising packets received via advertising channels. A white list including device class bits of preferred device class bits may be used for device filtering. The BLE baseband processor 314 may be enabled to extract device class bits from the received advertising packets and compare them with the white list in the BLE memory 316. If the extracted device bits may be found in the white list, the BLE baseband processor 314 may continue to process the received advertising packets, otherwise, the received advertising packets may be discarded. The BLE baseband processor 314 may be configured to wake up the host processor 322 whenever receiving advertising packets from advertisers in the white list. The host processor 322 may be enabled to process the received advertising packets using algorithms in the memory 326 for various applications.

In addition, the BLE transceiver 300 may be operable to transmit BLE2 signals via the BLE RF front-end 312. The BLE baseband processor 314 may provide outbound BLE2 baseband signals to the BLE RF front-end 312. The BLE RF front-end 312 may be operable to modulate the outbound BLE2 baseband signals using GFSK modulation at a modulation index in a range of 0.56 to 0.70 such that the modulated signal has a data rate of 2 Megabits per second and a symbol rate of 2 Megasymbols per second. The BLE RF front-end 312 can upconvert the modulated signal into a BLE2 signal having an RF frequency (e.g., 2.4 GHz). The BLE RF front-end 312 may transmit the BLE2 signal via an advertising channel or a data channel depending on the role of the BLE transceiver 300.

Figure 4:
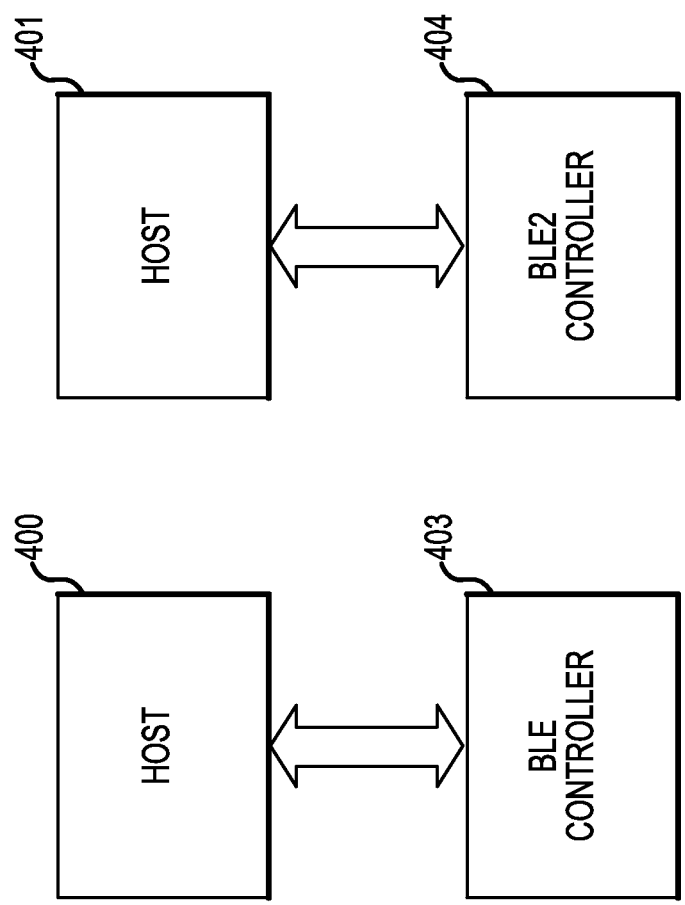
FIG. 4 illustrates an example of single mode BLE systems according to one or more implementations of the subject technology.

FIG. 4 illustrates an example of single mode BLE systems according to one or more implementations of the subject technology. FIG. 4 provides a case when BLE and BLE2 systems are implemented separately. Here, host 400 operates with a BLE controller 403 and host 401 operates with a separate BLE2 controller 404. The BLE system composed of host 401 and BLE2 controller 404 is an example of a single mode BLE2 system. As will be discussed in further detail below, host 401 may operate with a BLE system consisting of both BLE and BLE2 system controllers.

Figure 5:
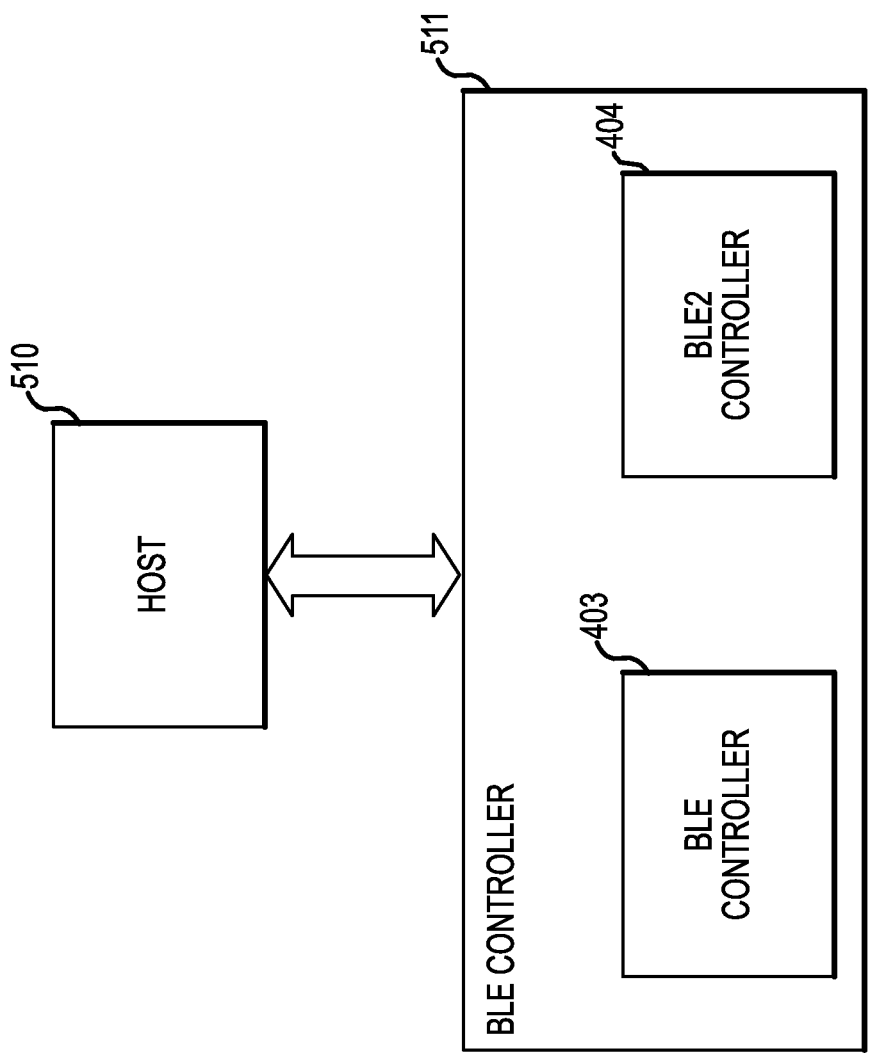
FIG. 5 illustrates an example of a multi-mode BLE system according to one or more implementations of the subject technology.

FIG. 5 illustrates an example of a multi-mode BLE system 500 according to one or more implementations of the subject technology. The multi-mode BLE system 500 includes a host 510 that operates with a multi-mode BLE controller 511 that includes both a BLE controller 403 and a BLE2 controller 404. With a multi-mode controller, host 510 may communicate with other respectively compatible devices using either legacy BLE or BLE2.

In some aspects, the multi-mode BLE controller 511 uses a Link Layer (LL) control channel to communicate with other legacy BLE and/or BLE2 compatible devices. During operation of a BLE/BLE2 compatible device, a physical radio channel is shared by a group of devices that are synchronized to a common clock and frequency hopping pattern. One device provides the synchronization reference and referred to as the master device and the remaining devices are synchronized as slave devices. A group of devices synchronized in this fashion form a piconet. This is the fundamental form of communication in the Bluetooth™ Low Energy wireless technology.

The physical channel is sub-divided into time units known as inter-frame spacers (e.g., transmissions at 150 μs intervals). Data is transmitted between BLE/BLE2 compatible devices in packets that are positioned in these inter-frame spacers. Frequency hopping takes place between the transmission and/or reception of packets. Above the physical channel, there may be layering of links and channels and associated control protocols. The hierarchy of channels and links from the physical channel and upwards may be composed of a physical channel, a physical link, a logical transport, a logical link and a L2CAP (Logical Link Control and Adaptation Protocol) channel.

Within a physical channel, a physical link is formed between a master device and slave device. The physical link provides bidirectional packet transport between the master and slave devices. Since a physical channel could include multiple slave devices, there may be restrictions on which devices form a physical link. There may be a physical link between each slave device and master device. Physical links may not be formed directly between the slaves in a piconet.

The physical link may be used as a transport for one or more logical links that support unicast synchronous, asynchronous and isochronous traffic, and broadcast traffic. Traffic on the logical links may be multiplexed onto the physical link by occupying slots assigned by a scheduling function in a resource manager of the multi-mode BLE controller 511. The LL control channel for the baseband and physical layers is carried over logical links in addition to user data. Devices that are active in a piconet have a default asynchronous connection-oriented logical transport that is used to transport the LL control channel signaling. The Link Manager function may utilize the LL control channel to control the operation of devices in the piconet and provide services to manage the lower architectural layers.

Above the baseband layer, the L2CAP channel provides a channel-based abstraction to applications and services. It carries out segmentation and reassembly of application data and multiplexing and de-multiplexing of multiple channels over a shared logical link. The L2CAP layer has a protocol control channel that is carried over a default asynchronous connection-oriented link (ACL) logical transport. Application data submitted to the L2CAP channel may be carried on any logical link that supports the L2CAP channel.

In some aspects, the multi-mode BLE controller 511 utilizes a host controller interface (HCI) to switch between legacy BLE and BLE2 connections. To support the switching, the HCI employs control protocol data units (PDU) to provide for control signaling in enabling communication of enhanced rate physical layer packets. In some aspects, an initiator (e.g., initiator 240) may utilize the control PDU to request the BLE controller 511 to enable or disable reception of enhanced rate physical layer packets (e.g., BLE2 packets). In this regard, the BLE controller 511 may inform the initiator 240 of this request (or selection) via a response message. The control PDU may include a modulation type field of one (1) octet in length to indicate if the BLE controller 511 should enable legacy BLE reception only (e.g., at a data rate of 1 Mbps with a symbol rate of 1 Msps) or should enable BLE2 reception using 2 Mbps GFSK (e.g., having a symbol rate of 2 Msps). The BLE controller 511 may return the response message including an indication that the command to enable or disable reception of enhanced rate physical layer packets (BLE2 packets) was successful or not.

Figure 6:
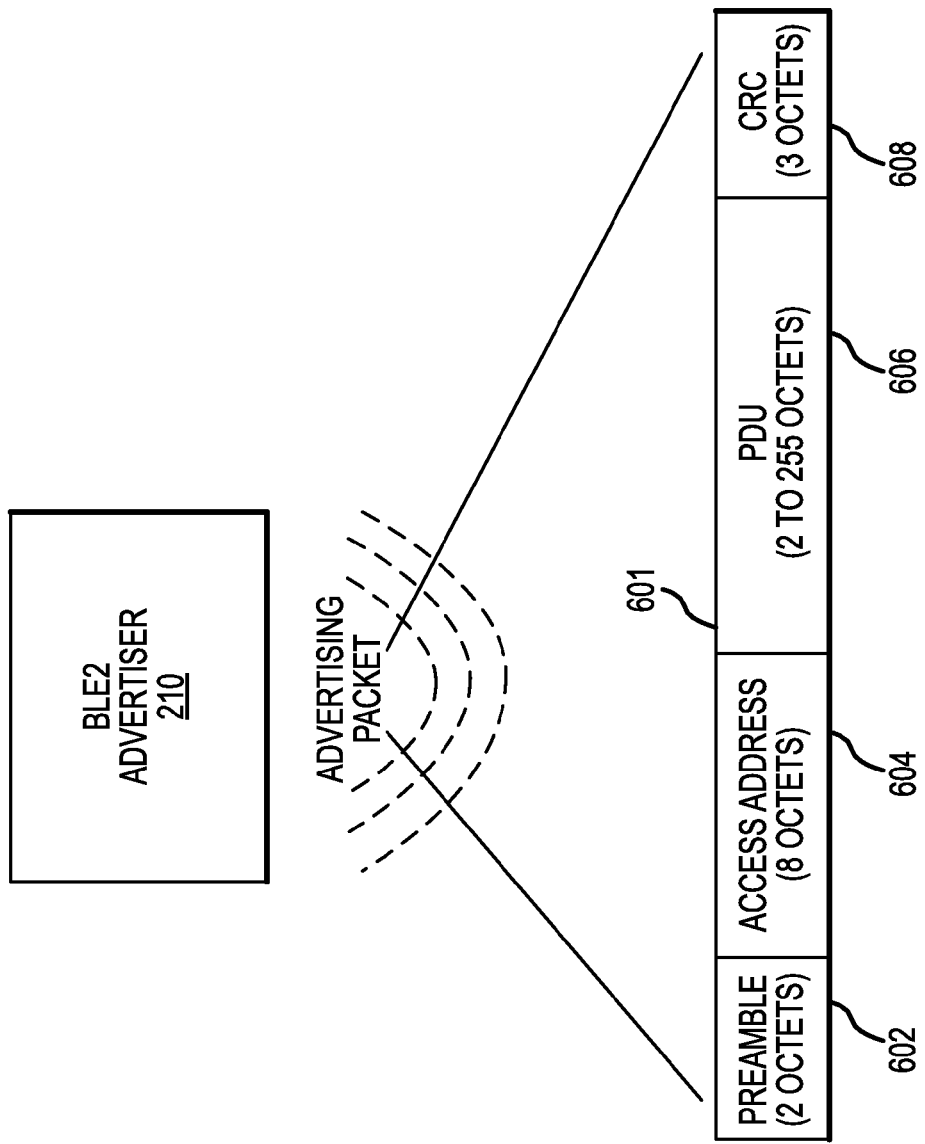
FIG. 6 is a diagram illustrating an example of an enhanced rate physical layer Bluetooth™ Low Energy (BLE2) air interface packet structure according to one or more implementations of the subject disclosure.

FIG. 6 is a diagram illustrating an example of an enhanced rate physical layer Bluetooth™ Low Energy (BLE2) air interface packet structure according to one or more implementations of the subject disclosure. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 6, the BLE2 air interface packet structure provides relevant fields in a BLE2 packet 601 that can be broadcast by a BLE2 advertiser (e.g., Advertiser 210) and received by a scanner device (e.g., Scanner 230). The BLE2 packet 601 includes a preamble 602, an access address 604, a protocol data unit (PDU) 606, and a cyclic redundancy check (CRC) 608.

The preamble 602 supports two (2) octets. In this regard, the preamble 602 may include two eight-bit long sequences of either '10101010' or '01010101', or a combination thereof. An advertising channel packet may use '0101010101010101' as the preamble 602. The preamble 602 may include either '10101010' or '01010101' for a data channel packet.

In this regard, the preamble 602 may include a sixteen bit preamble. In some aspects, an advertising channel packet may use '0xAAAA' (hex) or '1010101010101010' (binary) as the preamble. Alternatively, the advertising channel packet may use '0x5555' or '0101010101010101' as the preamble. Similarly, the data channel packet preamble can be either 0xAAAA or 0x5555, depending on the LSB of the access address. For example, if the LSB of the access address is 1, the preamble can be 0x5555, otherwise the preamble can be 0xAAAA.

The preamble 602 may be used by a BLE2 receiver (e.g., initiator 240 of FIG. 2) to perform frequency synchronization, symbol timing estimation, and automatic gain control training. In this regard, the BLE2 receiver may be enabled to assign particular operating frequencies for a fast link layer connection setup in order to save power. The initiator 240 may be enabled to use the preamble 602 in the received advertising packets to perform frequency synchronization to the assigned particular operating frequencies to save power at the initiator 240.

The access address 604 supports eight (8) octets. In this regard, the access address 604 may include a 64-bit value. The access address 604 may include a binary bit string of '0110101101111101100100010111000101101011011110 11001000101110001' for an advertising channel packet. In one or more implementations, the access address for all advertising channel packets shall be 0x8E89BED6 (hex) repeated twice. The access address 604 in data channel packets may be unique for each link layer connection between any two devices.

The access address 604 in data channel packets may include a pseudo-random 64-bit value, generated by an intended initiator of a corresponding link layer connection. For example, the pseudo-random 64-bit value is generated by the device in the initiating state and then sent in a connection request. In some aspects, the initiator ensures that the access address meets the following requirements: (1) the access address 604 may have no more than six consecutive zeros or ones; (2) the access address 604 may not be the advertising channel packets' access address; (3) the access address 604 may not be a sequence that differs from the advertising channel packets' access address by a single bit; (4) the access address 604 may not have all eight octets equal to one another; (5) the access address 604 may not have no more than 56 transitions; and (6) the access address 604 may have a minimum of two transitions in the most significant six bits.

In some implementations, in a correctly received packet, 56 or more bits out of 64 bits in the access address match. However, if fewer than 56 bits in the access address match, the receiver may discard the packet.

In some aspects, the preamble 602 and the access address 604 can be followed by the PDU 606. For example, when a packet is transmitted in an advertising physical channel, the PDU 606 can be the advertising channel PDU. When a packet is transmitted in a data physical channel, the PDU 606 may be the data channel PDU. In some implementations, the maximum length of the PDU 606 can be 255 octets.

The PDU 606 may include actual data and/or control information such as, for example, a 48-bit device address, from higher layers. The PDU 606 may be in a variable size ranging from 6 to a maximum of 39 octets. The leftmost bit may be transmitted first. For packets in advertising channels such as advertising packets, initiator packets, and/or scanning packets, the PDU 606 may include device addresses such as advertiser address, initiator address, or scanner address, respectively. A device address is a unique 48-bit Bluetooth™ Low Energy device address including key bits for corresponding device class. When device filtering used, the receiver may be enabled to utilize device class bits of corresponding device address such as advertiser address, initiator address, or scanner address for device filtering.

In some aspects, at the end of every link layer packet, there can be a 24-bit CRC which can be calculated over the PDU 606, for example, using a CRC polynomial. The CRC 608 may be appended to the PDU 606 within the BLE2 packet 601 to provide for integrity verification. The CRC 608 may be calculated on the PDU 606. The CRC 608 may be utilized at a receiver to determine whether the PDU 606 was received or transmitted in error. For example, upon the reception of the BLE2 packet 601, a local CRC may be calculated on the PDU 606 to be compared with the CRC 608 in the BLE2 packet 601. A mismatch between the local CRC and the CRC 608 may indicate a CRC error. Two consecutive packets received with CRC error within a BLE connection event or a BLE2 connection event may cause a corresponding connection closed event.

In an exemplary operation, the BLE2 packet 601 may be for an advertising packet with the preamble 602 of 0xAAAA and the access address 604 of 0x8E89BED68E89BED6. The BLE2 packet 600 may be transmitted periodically in advertising channels by an advertiser (e.g., advertiser 210 of FIG. 2) for a service advertisement and/or a link layer connection. In some aspects, the advertiser 210 is enabled to transmit the BLE2 packet 601 for a link layer connection with a specific initiator (e.g., initiator 240 of FIG. 2). The PDU 606 may include information such as a 48-bit advertiser's device address and a 48-bit initiator's device address.

Figure 7:
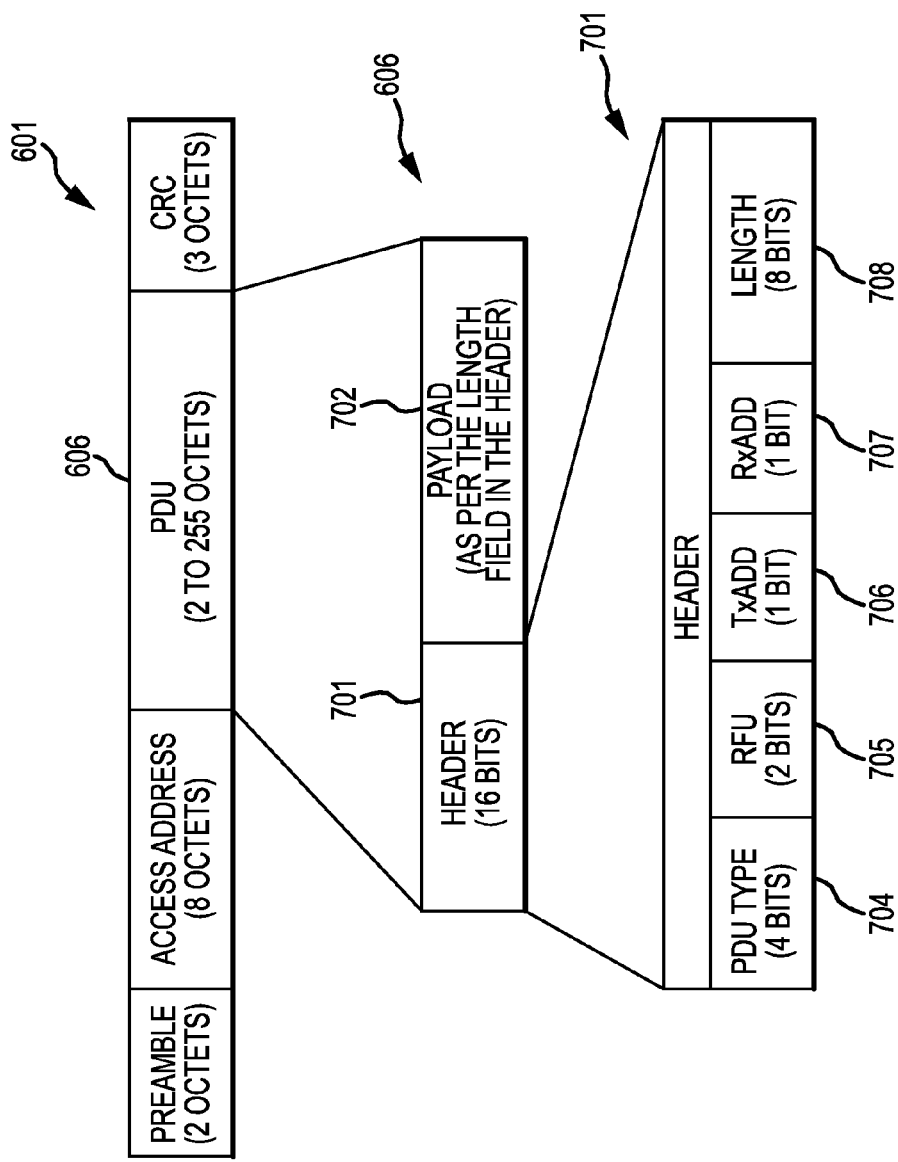
FIG. 7 illustrates an example of an advertising channel protocol data unit (PDU) according to one or more implementations of the subject technology.

FIG. 7 illustrates an example of an advertising channel protocol data unit (PDU) according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The PDU 606 of the BLE packet 601 (FIG. 6) may be applicable to both advertising and data channel packets. As such, the PDU of advertising channel packets can sometimes be referred to as an advertising channel PDU, and the PDU of data channel packets can sometimes be referred to as a data channel PDU.

As shown in FIG. 7, the BLE packet 601 is employed as an advertising channel packet, in which the PDU 606 includes a header 701 and a payload 702. The header 701 may be a 16-bit header, while the payload 702 may be a variable size payload. In some aspects, the payload 702 may be as per the length field in the header 701. The header 701 may be structured to include multiple fields for the enhanced rate physical layer BLE activities. In this regard, the header 701 includes PDU type field 704, reserved-for-future-use (RFU) field 705, transmitter address (TxAdd) field 706, receiver address (RxAdd) field 707 and length field 708. Here, the PDU type field 704 includes four (4) bits, the RFU field 705 includes two (2) bits, the TxAdd field 706 and RxAdd field 707 each include 1 bit, and the length field 708 includes eight (8) bits.

In comparison to Bluetooth™ Low Energy systems, where the data rate is 1 megabits per second with a symbol rate of 1 megasymbols per second, all fields except the length field 708 are unchanged. In this respect, the length field 708 has been increased to eight (8) bits from six (6) bits to allow for larger packets. In some aspects, the length field 708 includes more than eight (8) bits.

Figure 8:
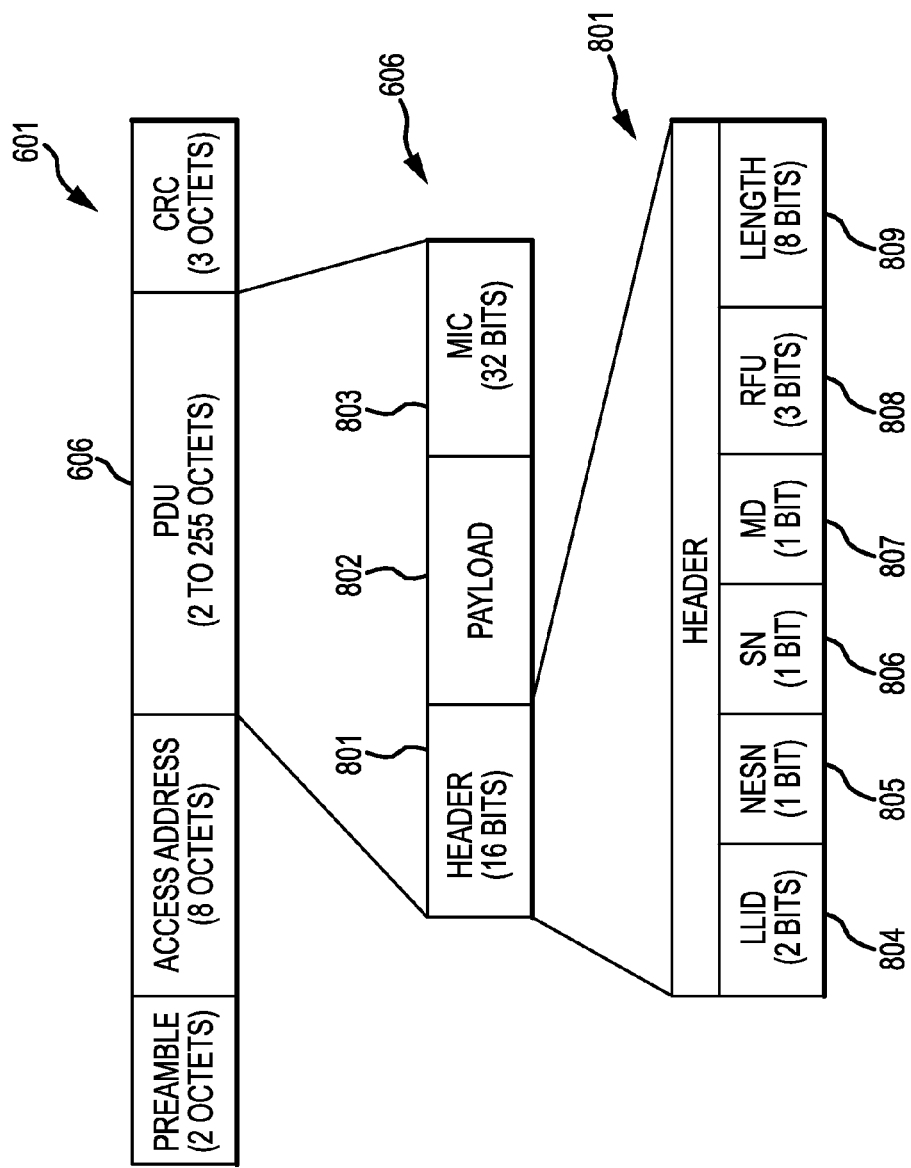
FIG. 8 illustrates an example of a data channel protocol data unit (PDU) according to one or more implementations of the subject technology.

FIG. 8 illustrates an example of a data channel protocol data unit (PDU) according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 8, the BLE packet 601 is employed as a data channel packet, in which the PDU 606 includes a header 801, a payload 802 and optionally a message integrity check (MIC) 803. The header 801 may be a 16-bit header, while the payload 802 may be a variable size payload. In some aspects, the payload 802 may be as per the length field in the header 801. The header 801 may be structured to include multiple fields for the enhanced rate physical layer BLE activities. In this regard, the header 801 includes logical link identifier (LLID) field 804, next expected sequence number (NESN) field 805, sequence number (SN) field 806, more data (MD) field 807, reserved-for-future-use (RFU) field 808 and length field 809.

In comparison to Bluetooth™ Low Energy systems, where the data rate is 1 megabits per second with a symbol rate of 1 megasymbols per second, all fields except the length field 809 are unchanged. In this respect, the length field 809 has been increased to 255 bytes from 31 bytes to allow for larger packets. In some aspects, the length field 809 includes more than 255 bytes.

The MIC 803 may not be included in an un-encrypted link layer connection, or in an encrypted link layer connection with a data channel PDU with the payload 802 having zero length, or in an encrypted link layer connection when the MIC 803 has been excluded during encryption negotiation.

Figure 9:
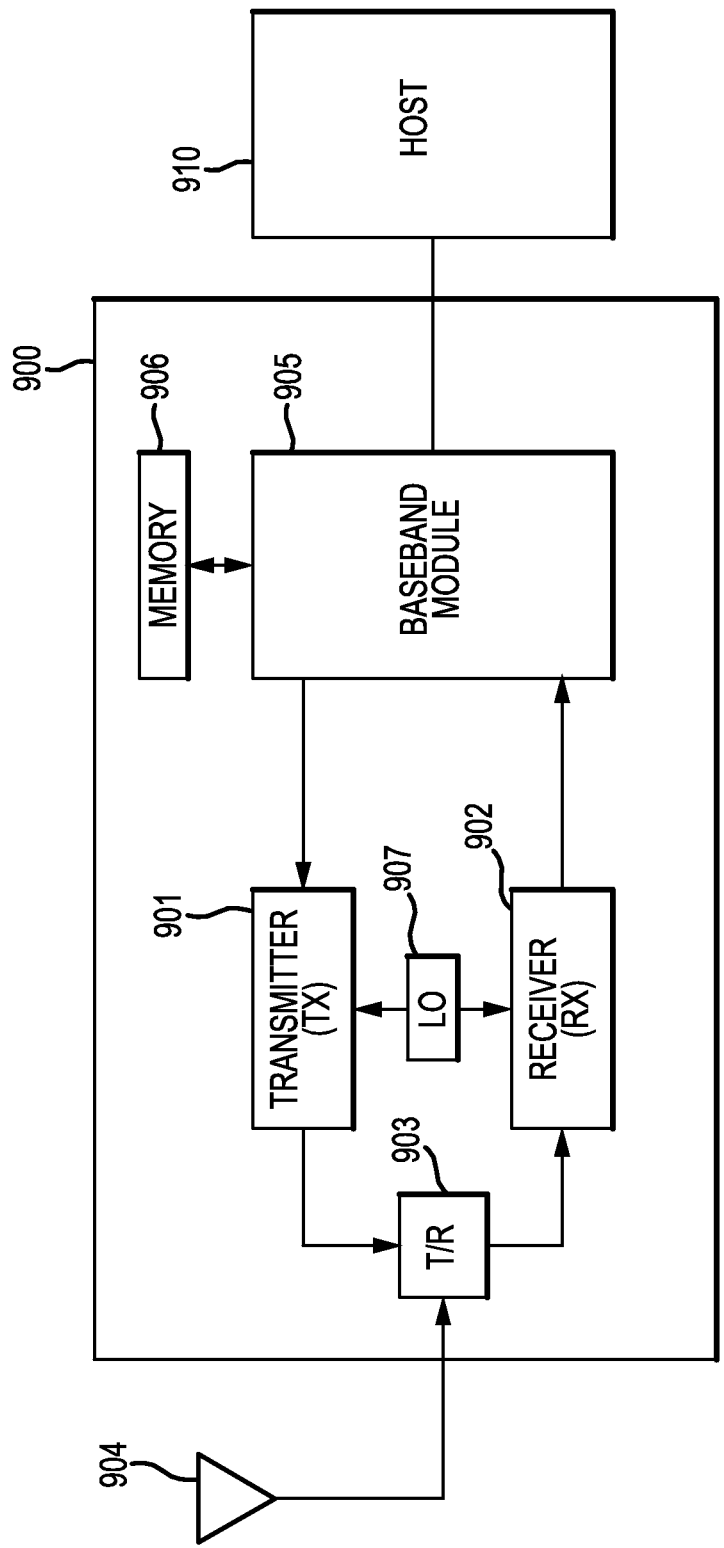
FIG. 9 illustrates a schematic block diagram of a wireless communication portion of a wireless device according to one or more implementations of the subject technology.

FIG. 9 illustrates a schematic block diagram of a wireless communication portion 100 of a wireless device according to one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The wireless communication portion 900 includes a transmitter (TX) 901, a receiver (RX) 902, a local oscillator (LO) 907 and a baseband module 905. Baseband module 905 may be configured to provide baseband processing operations. In some implementations, baseband module 905 includes a digital signal processor (DSP). The baseband module 905 is coupled to a host unit (e.g., host 910), an applications processor or other unit(s) that provides BLE and/or BLE2 operational processing for the device and/or interface with a user.

As shown in FIG. 9, a host 910 is provided. The host 910 may represent a host module of a BLE device or a BLE2 device, while the wireless communication portion 900 is utilized to provide the radio (e.g. RF front end) and baseband functions. The radio portion of the wireless communication portion 900 may be implemented to support single mode BLE or BLE2, multi-mode BLE/BLE2, or may include other wireless systems such as WLAN (e.g. WiFi) and/or cellular or satellite communications. With BLE2 operations, the wireless communication portion 900 provides the PHY layer and LINK layer functionality of BLE/BLE2 controller, such as controller 511 shown in FIG. 5. Any or all of the hardware shown in FIG. 9 may be incorporated in one or more of the wireless communication devices shown in FIG. 1.

The memory 906 is coupled to the baseband module 905. The memory 906 may be utilized to store data including program instructions that operate on the baseband module 905. Various types of memory devices may be utilized for memory 906. The memory 906 may be located anywhere within the wireless communication portion 900.

The transmitter 901 and receiver 902 are coupled to an antenna 904 via transmit/receive (T/R) switch module 903. The T/R switch module 903 is configured to switch the antenna between the transmitter and receiver depending on the mode of operation. In some aspects, separate antennas are used for transmitter 901 and receiver 902. In some implementations, multiple antennas or antenna arrays are utilized with the wireless communication portion 900 to provide antenna diversity or multiple input and/or multiple output (MIMO) capabilities.

For frequencies in a gigahertz range (e.g., 2.4 GHz to 5 GHz), omni-directional antennas may provide appropriate coverage for communicating between wireless devices. However, at higher frequencies, directional antennas with beamforming capabilities are utilized to direct the beam to concentrate the transmitted energy, due to the limited range of the signal. In these instances, antenna arrays allow for directing the beam in a particular direction or target.

Outbound data for transmission from the host 910 are forwarded to the baseband module 905 and converted into baseband signals, and then upconverted for transmission via the transmitter 901. For example, the transmitter 901 converts the baseband signals to outbound radio frequency (RF) signals for transmission from the wireless communication portion 900 via antenna 904. The transmitter 901 may utilize one of a variety of up-conversion or modulation techniques to convert the outbound baseband signals to outbound RF signal. The conversion process is dependent on the particular communication standard or protocol being utilized. In this regard, the transmitter 901 is configured to modulate the outbound data using GFSK with a bandwidth bit period product of 0.50 and a modulation index in a range of 0.56 to 0.70. As such, the data transmitted as a BLE2 system has a symbol rate of 2 Megasymbols per second. In some aspects, the output data rate is 2 Megabits per second for the BLE2 system.

Changes in transmitter characteristics between BLE and BLE2 can include changes to one or more of, transmitter modulation, spurious emissions and radio frequency tolerance of the transmitter 901. For example, the transmitter 901 can employ Gaussian Frequency Shift Keying (GFSK) as a modulation type with a bandwidth bit period product (BT) of 0.50. Depending on implementation, various ranges of modulation index can be used; however, in certain aspects the modulation index can be in a range of 0.56 to 0.70 (e.g., 0.64). In certain aspects, a binary one ("1") can be represented by a positive frequency deviation, and a binary zero ("0") can be represented by a negative frequency deviation.

In one or more implementations, the minimum frequency deviation of each transmission from the transmitter 901 can be defined as: Fmin=min{|Fmin+|,Fmin−}, corresponding to a 910 sequence, which is no smaller than ±80% of the frequency deviation with respect to the transmit frequency, corresponding to a 00001111 sequence.

In certain aspects, the minimum frequency deviation is equal to or greater than 230 kHz. As a result, transmitted data can have a symbol rate of approximately 2 Ms/s. In some implementations, the symbol timing accuracy can be higher than ±50 ppm. In some implementations, the zero crossing error is the time difference between the ideal symbol period and the measured crossing time. In some aspects, the zero crossing error is less than ±⅛ of a symbol period.

Changes to spurious emissions between BLE and BLE2 in the transmitter 901 can include changes to an in-band spurious emission. In certain aspects, an adjacent channel power can be specified for channels at least 4 MHz from a carrier signal. This adjacent channel power can be defined as the sum of the measured power in a 2 MHz bandwidth.

A spectrum measurement can be performed with a 90 kHz resolution bandwidth and an average detector. In one or more implementations, the transmitter 901 is configured to transmit on an RF channel (or physical channel) with a center frequency M, in which the adjacent channel power can be measured on a 1 MHz RF frequency N. The transmitter 901 can then transmit a pseudo random data pattern in the payload throughout the test. In some implementations, a frequency offset of 4 MHz, where |M−N|=4, corresponds to a spurious power value of −20 dBm, and a frequency offset of 6 MHz or greater, where |M−N|≥6, corresponds to a spurious power value of −30 dBm.

In certain implementations, exceptions are allowed in multiple bands, for example, in up to three bands of 1 MHz width, centered on a frequency that is an integer multiple of 1 MHz. In some aspects, these exceptions can have an absolute value of −20 dBm or less.

In one or more implementations, BLE2 enhancements can also affect changes in radio frequency tolerance. In certain aspects, the deviation of the center frequency during the packet may not exceed ±150 kHz, including both the initial frequency offset and drift. In addition, the frequency drift during any packet can be less than 50 KHz, and the drift rate can be less than 400 Hz/μs.

In a similar manner, inbound RF signals are received by the antenna 904 and coupled to the receiver 902. The receiver 902 then converts the inbound RF signals into inbound baseband signals, which are then coupled to baseband module 905. The receiver 902 may utilize one of a variety of down-conversion or demodulation techniques to convert the inbound RF signals into inbound baseband signals. The inbound baseband signals are processed by the baseband module 905 and inbound data is output from baseband module 905 to the host 910.

In some implementations, BLE2 enhancements can also affect receiver characteristics of the receiver 902. In some aspects, the reference sensitivity level is −70 dBm. The packet error rate corresponding to a defined bit error ratio (BER) can be used in receiver characteristic measurements. An actual sensitivity level may be defined as the receiver input level for which a BER of 0.1% is achieved. The actual sensitivity level of the receiver can be less than or equal to −70 dBm with any transmitter. However, in certain aspects, parameter variations may be present. For example, parameter variations may occur in one or more of initial frequency offset, frequency drift, symbol rate and/or frequency deviation.

In some aspects, interference performance can be measured with a wanted signal of 3 dB over the reference sensitivity level. In some aspects, co-channel interference may be limited to a signal-to-interference ratio of 24 dB. Adjacent interference of 2 MHz may be limited to a signal-to-interference ratio of 18 dB. Adjacent interference of 4 MHz may be limited to a signal-to-interference ratio of −14 dB. Adjacent interference of equal to or greater than 6 MHz may be limited to a signal-to-interference ratio of −24 dB. Image frequency interference may be limited to a signal-to-interference ratio of −6 dB. Adjacent interference of 1 MHz to in-band image frequency may be limited to a signal-to-interference ratio of −12 dB. The BER may be ≤0.1% for the aforementioned signal-to-interference ratios. If the image frequency is not equal to n*1 MHz (where n is a positive integer), then the image frequency may be defined as the closest N*1 MHz frequency for integer n.

Any frequencies where Bluetooth™ design requirements may not be met are sometimes referred to as "spurious response RF channels." In some implementations, five spurious response RF channels are allowed with a distance of ≥3 MHz from the wanted signal, excluding the image frequency and the image frequency ±1 MHz. On these spurious response RF channels, a relaxed interference requirement of C/I=−17 dB may be met.

In one or more implementations, out-of-band blocking applies to interference signals outside the 2400-2483.5 MHz band. The out-of-band suppression (or rejection) may be measured with a wanted signal 3 dB over the reference sensitivity level. In some implementations, the interfering signal is a continuous wave signal and the desired signal may be a reference signal, for example, with a center frequency of 2440 MHz. In some aspects, the BER is ≤0.1%.

In some aspects, out-of-band blocking by the receiver 902 may be performed if an interfering signal frequency in a range of 30 MHz to 2000 MHz having an interfering signal power level of −30 dBm is detected. In this regard, a measurement resolution of 9 MHz may be employed. Interfering signals detected within frequencies 2003 MHz to 2399 MHz and 2482 MHz to 2997 MHz having a power level of −25 dBm may be suppressed. In this regard, a measurement resolution of 3 MHz may be employed. In addition, interfering signals detected within 3000 MHz to 12.75 GHz having a power level of −30 dBm may be suppressed. In this regard, a measurement resolution of 25 MHz may be employed.

In certain implementations, out-of-band blocking exceptions may be permitted. In some aspects, up to 9 exceptions are permitted, which are dependent upon the given RF channel and are centered at a frequency which is an integer multiple of 1 MHz. For example, for at least 7 spurious response frequencies, a reduced interference level of at least −50 dBm is allowed to achieve a BER≤0.1%. Similarly, for a maximum of 3 spurious response frequencies, the interference level may be lower.

In terms of intermodulation characteristics, the actual sensitivity performance of the receiver 902, where BER≤0.1%, can be achieved if the wanted signal is located at a frequency f0 with a power level 6 dB over the reference sensitivity level. In this regard, the wanted signal may be implemented as a reference signal. A static sine wave signal may be at a frequency f1 with a power level of −50 dB. In addition, an interfering signal may be located at a frequency f2 with a power level of −50 dB. Frequencies f0, f1 and f2 may be selected such that f0=2*f1−f2 and |f2−f1|=n*1, where n can be 3, 4 or 5.

In one or more implementations, the maximum usable input level in which the receiver can operate can be greater than −10 dBm, and the BER can be less than or equal to 0.1% at −10 dBm input power.

The LO 907 provides local oscillation signals to the transmitter 901 for up-conversion and to the receiver 902 for down-conversion. In some aspects, separate LO signals may be used for the transmitter 901 and the receiver 902. Although a variety of LO circuitry may be used, in some implementations, a phase-locked loop (PLL) is utilized to lock the LO to output a frequency-stable LO signal based on a selected channel frequency.

The baseband module 905, the LO 907, the transmitter 901 and the receiver 902 may be integrated on a same integrated circuit (IC) chip. The transmitter 901 and receiver 902 can sometimes be referred to as RF front-end modules (or components) or radios. In some aspects, one or more of the aforementioned components may be on separate IC chips. Similarly, other components shown in FIG. 9 may be incorporated into the same IC chip, along with the baseband module 905, the LO 907, the transmitter 901 and the receiver 902. In some aspects, the antenna 904 is incorporated into the same IC chip. With the advent of system-on-chip (SOC) integration, host devices, application processors and/or user interfaces, such as the host 910, may be integrated into the same IC chip along with the baseband module 905, the transmitter 901 and the receiver 902.

The application of 2 Megabit modulation directly to BLE, for example, has a number of advantages, including lower power consumption and higher scheduling capacity. In addition, the subject disclosure provides for the synchronization of two different modulation types (e.g., GFSK at 1 Mbps and GFSK at 2 Mbps) using a same receive window and the decoding of a same protocol (e.g., BLE).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method of communicating data in a Bluetooth™ low energy (BLE) module, the method comprising:
   determining whether to modulate an outbound communication signal with a first modulation scheme or a second modulation scheme based on an exchange of control information with a remote device over an advertising channel, the second modulation scheme being associated with a symbol rate greater than that of the first modulation scheme, the first modulation scheme being associated with a first Bluetooth low energy mode and the second modulation scheme being associated with a second Bluetooth low energy mode;
   modulating the outbound communication signal into a modulated signal with the second modulation scheme based on the control information indicating that the remote device is associated with the second modulation scheme; and
   facilitating transmission of the modulated signal to the remote device via a wireless communication connection associated with the second Bluetooth low energy mode.

2. The method of claim 1, wherein the outbound communication signal is modulated based on a modulation index in a range of 0.56 to 0.70.

3. The method of claim 1, wherein the modulated signal has a packet format that supports advertising channel packets and data channel packets.

4. The method of claim 1, wherein the second modulation scheme is Gaussian Frequency Shift Keying (GFSK).

5. The method of claim 1, wherein the modulated signal includes an indication that modulation is based on 2 Megabits.

6. The method of claim 1, wherein the outbound communication signal is modulated with a bandwidth bit period product of 0.5.

7. The method of claim 1, wherein the modulated signal is transmitted at a data rate of 2 Megabits per second.

8. The method of claim 1, further comprising:
   facilitating transmission of a message to the remote device within an indication of a selected modulation type, the message comprising a request to the remote device to transmit advertising channel packets or data channel packets based on the selected modulation type.

9. The method of claim 8, further comprising:
   facilitating receipt of a notification from the remote device with an indication that the transmitted message to the remote device was received by the remote device.

10. The method of claim 1, wherein the modulated signal is transmitted. using a 2-Mbit physical layer.

11. A method of communicating data in a Bluetooth™ low energy (BLE) module, the method comprising:
    facilitating receipt of an inbound radio frequency (RF) signal;
    determining if the inbound RF signal is associated with a first modulation scheme or a second modulation scheme based on an exchange of control information with a remote device, the second modulation scheme being associated with a symbol rate greater than that of the first modulation scheme, the first modulation scheme being associated with a first Bluetooth low enemy mode and the second modulation scheme being associated with a second Bluetooth low energy mode; and
    demodulating the inbound RF signal with the second modulation scheme based on the control information indicating that the remote device is associated with the second Bluetooth low energy mode.

12. The method of claim 11, wherein facilitating the receipt of the inbound radio frequency (RF) signal comprises facilitating receipt of an overhead portion of the inbound RF signal, and wherein determining if the inbound RF signal is associated with the first modulation scheme or the second modulation scheme comprises determining if the overhead portion includes an indication of a modulation type.

13. The method of claim 12, further comprising:
    switching from a first Bluetooth wireless communication mode to a second Bluetooth wireless communication mode based on the modulation type, wherein the second Bluetooth wireless communication mode is associated with a first data rate that is greater than a second data rate associated with the first Bluetooth wireless communication mode.

14. The method of claim 13, wherein the second Bluetooth wireless communication mode is associated with a first symbol rate that is greater than a second symbol rate associated with the first Bluetooth wireless communication mode.

15. The method of claim 13, wherein the second Bluetooth wireless communication mode has a packet format that supports advertising channel packets and data channel packets.

16. The method of claim 13, wherein facilitating receipt of the inbound radio frequency (RF) signal comprises facilitating receipt of a first packet associated with the first Bluetooth wireless communication mode and a second packet associated with the second Bluetooth wireless communication mode, and wherein the first and second packets are received in a single receive window.

17. A transceiver comprising:
   a receiver configured to:
      facilitate receipt of an inbound radio frequency (RF) signal;
      determine if the inbound RF signal is associated with a first modulation scheme or a second modulation scheme based on an exchange of control information with a remote device, the second modulation scheme being associated with a symbol rate greater than that of the first modulation scheme, the first modulation scheme being associated with a first Bluetooth low energy mode and the second modulation scheme being associated with a second Bluetooth low energy mode; and
      demodulate the inbound RF signal with the second modulation scheme based on the control information indicating that the remote device is associated with the second modulation scheme; and
   a transmitter communicatively coupled to the receiver, the transmitter configured to:
      determine whether to modulate an outbound communication signal with the first modulation scheme or the second modulation scheme based on the exchange of the control information with the remote device;
      modulate the outbound communication signal into a modulated signal with the second modulation scheme based on the control information indicating that the remote device is associated with the second modulation scheme; and
      facilitate transmission of the modulated signal to the remote device via a wireless communication connection associated with the second Bluetooth low energy mode.

18. The transceiver of claim 17, wherein the receiver and the transmitter are configured to switch between an enhanced rate physical layer Bluetooth™ Low Energy (BLE2) mode and a legacy Bluetooth™ Low Energy (BLE) mode, wherein the BLE2 mode is configured to operate at a data rate of 2 Mbps with a symbol rate of 2 Megasymbols per second and the legacy BLE mode is configured to operate at a data rate of 1 Mbps with a symbol rate of 1 Megasymbols per second, and wherein the first Bluetooth low energy mode corresponds to the legacy BLE mode and the second Bluetooth low energy mode corresponds to the BLE2 mode.

19. The transceiver of claim 17, wherein the transmitter and receiver are configured to use a same packet format for both advertising channel packets and data channel packets.

20. The transceiver of claim 17, wherein the transmitter is configured to perform the modulation using Gaussian Frequency Shift Keying (GFSK) as the second modulation scheme with a bandwidth bit period product of 0.5 and a modulation index in a range of 0.56 to 0.70.

* * * * *